(12) United States Patent
Franiatte

(10) Patent No.: US 7,018,112 B2
(45) Date of Patent: Mar. 28, 2006

(54) METHOD OF ASSEMBLING AN OPTICAL SYSTEM WITH AN OPTICAL PACKAGE IN ADVANCE

(75) Inventor: Olivier Franiatte, Saint Egreve (FR)

(73) Assignee: STMicroelectronics S.A., (FR)

( * ) Notice: Subject to any disclaimer, the term of this patent is extended or adjusted under 35 U.S.C. 154(b) by 142 days.

(21) Appl. No.: 10/739,924

(22) Filed: Dec. 18, 2003

(65) Prior Publication Data

US 2004/0218876 A1   Nov. 4, 2004

(30) Foreign Application Priority Data

Dec. 24, 2002   (FR) .................................. 02 16605

(51) Int. Cl.
*G02B 6/36* (2006.01)
*H01J 3/14* (2006.01)

(52) U.S. Cl. ............................ 385/91; 385/91; 385/92; 385/93; 250/216; 250/239

(58) Field of Classification Search ............ 385/88–94; 250/216, 239, 81, 99, 100, 433; 267/434, 267/678; 361/728–745, 752–759
See application file for complete search history.

(56) References Cited

U.S. PATENT DOCUMENTS 6,483,101 B1 * 11/2002 Webster ...................... 250/216
2002/0006687 A1   1/2002 Lam

FOREIGN PATENT DOCUMENTS

EP   0407671   1/1991
EP   0555872   8/1993

* cited by examiner

*Primary Examiner*—Phan T. H. Palmer
(74) *Attorney, Agent, or Firm*—Jenkens & Gilchrist, PC

(57) ABSTRACT

An optical system with an optical package capable of being assembled in advance. The optical package comprises a body that contains an integrated-circuit chip having an optical sensor on its front face, a ring and an optical device intended to be placed in front of the said optical sensor. Adhesive is deposited on the internal thread (3) of the ring (2) and/or on the external thread (7) of the optical device (5). The optical device (5) is screwed into the ring (2) as far as an entered position. The ring (2), which is provided with the optical device (5), is affixed to the body (12) of the package (11). In order to bring the optical device (5) to an adjustment position relative to the said optical sensor (14), the said adjustment position being away from its entered position, the optical device is unscrewed relative to the ring. A treatment (19) is then applied to the adhesive (10) so as to fix the optical device (5) in the said ring (2) at the adjustment position reached.

9 Claims, 4 Drawing Sheets

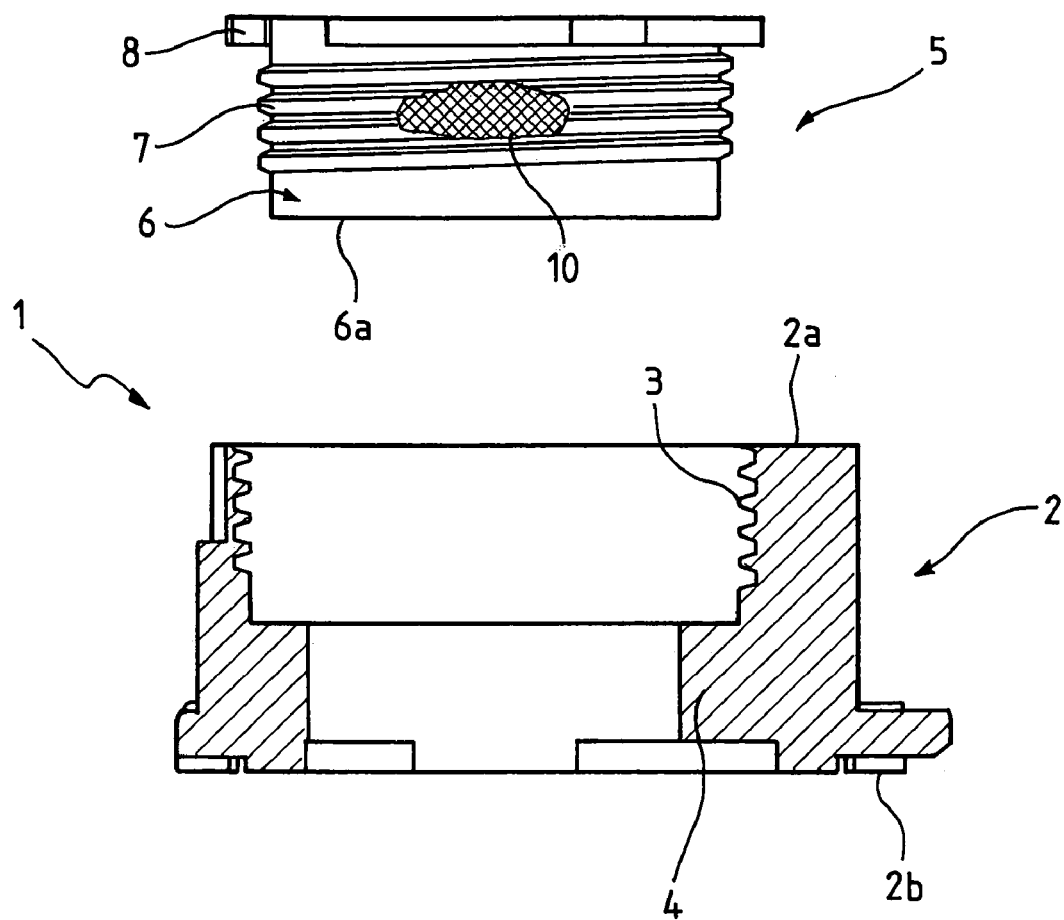

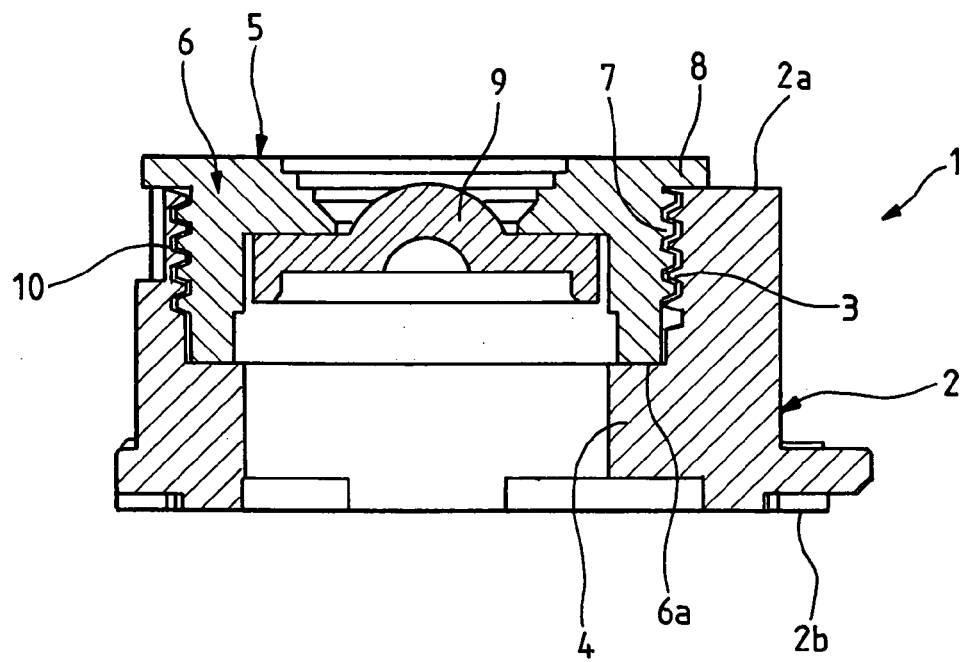
FIG_2
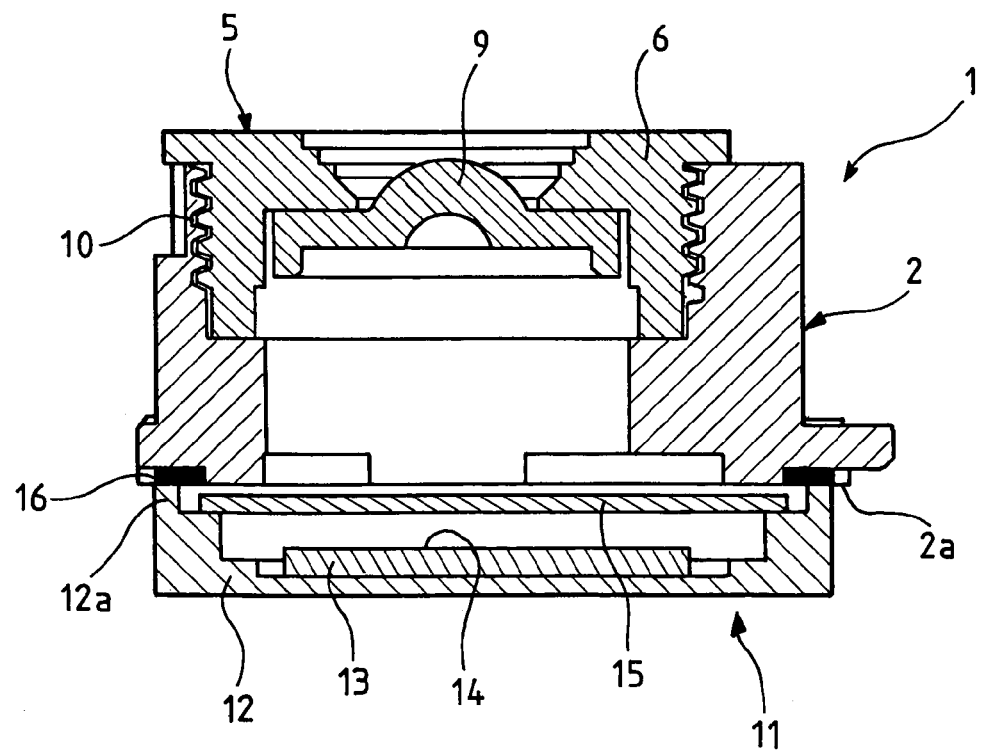
FIG_3

FIG_4
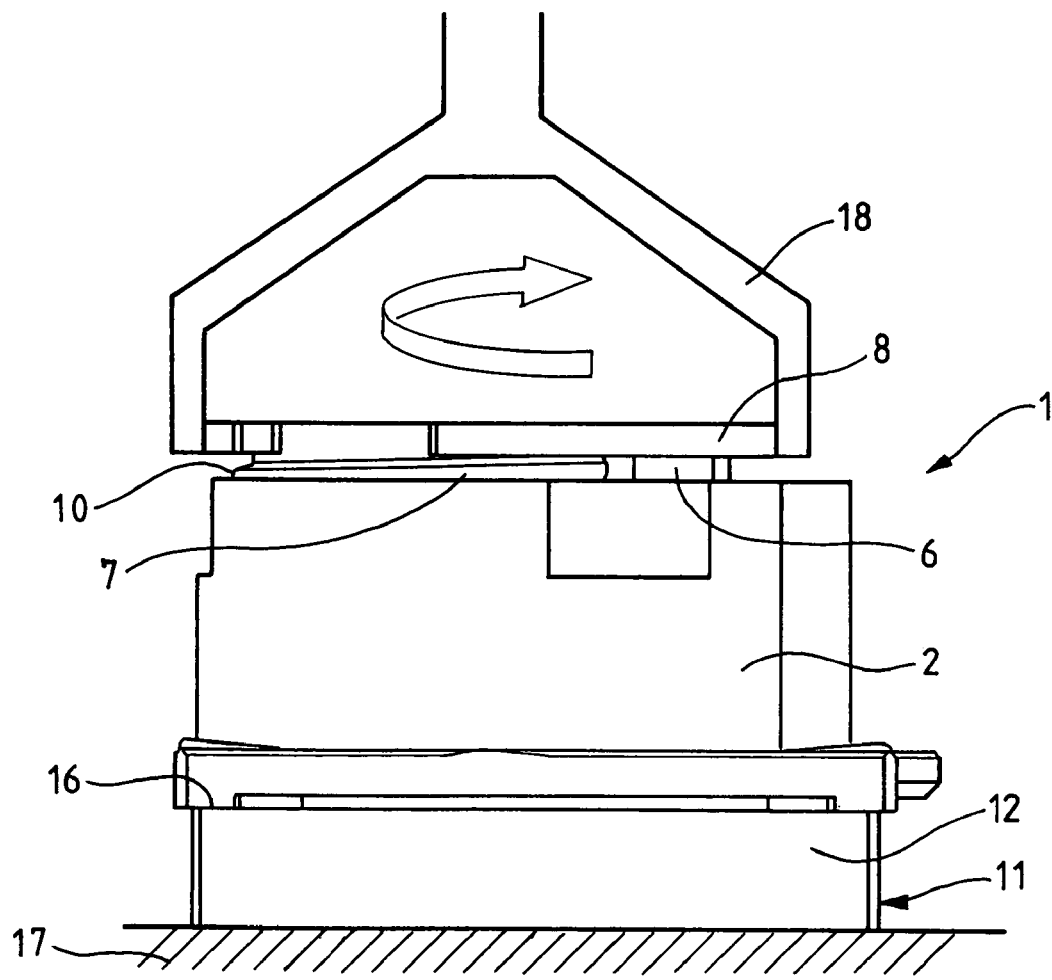

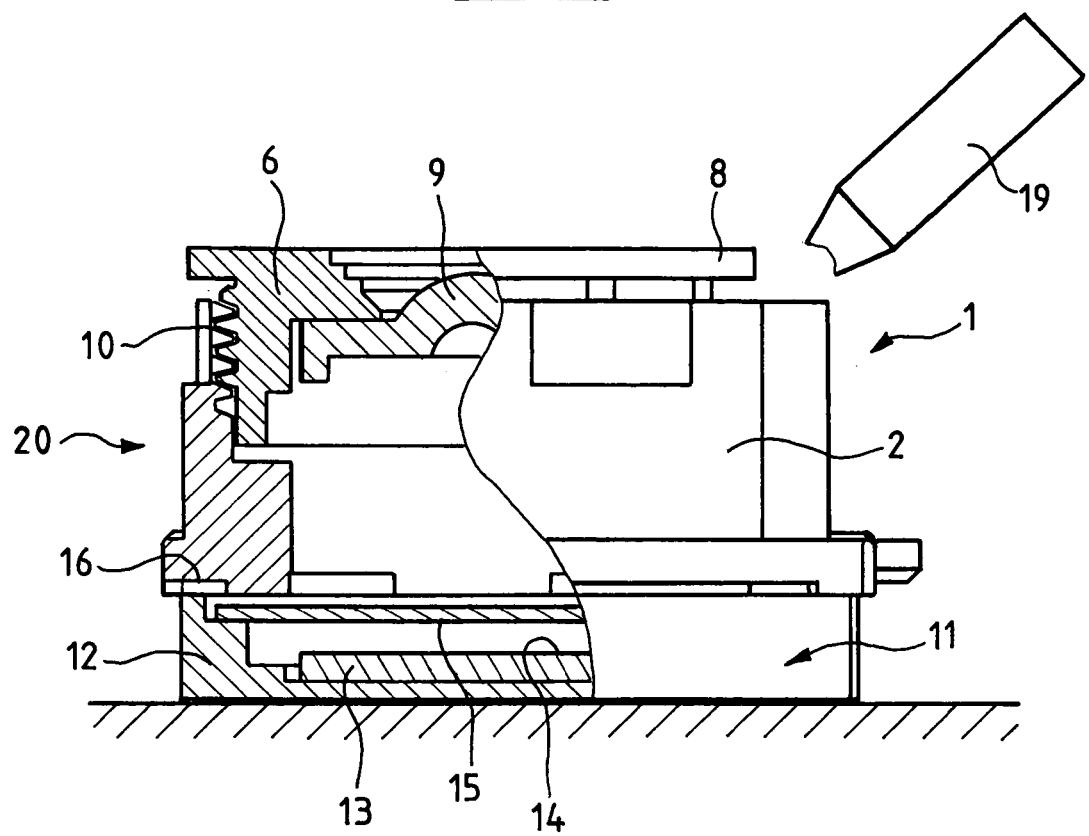
FIG_5

METHOD OF ASSEMBLING AN OPTICAL SYSTEM WITH AN OPTICAL PACKAGE IN ADVANCE

PRIORITY CLAIM

The present application claims priority from French Application for Patent No. 02 16605 filed Dec. 24, 2002, the disclosure of which is hereby incorporated by reference.

BACKGROUND OF THE INVENTION

1. Technical Field of the Invention

The present invention relates to the field of assembling optical systems with an optical package in advance, the optical package comprising a body that contains an integrated-circuit chip having an optical sensor.

2. Description of Related Art

In general, optical systems include an external ring into which an internal ring carrying an optical member, such as a lens, is screwed. The annular rear portion of the external ring of the optical system is fixed by adhesive bonding to the annular front portion of the body of the optical package in a position such that the optical axis of the optical member corresponds to the optical axis of the optical sensor of the chip.

In the current technique, when the above assembly operation has been carried out, the optical member is adjusted relative to the optical sensor of the chip by screwing and/or unscrewing the internal ring of the optical system. When the adjustment position is reached, liquid adhesive is deposited, by means of one or more needles, against the thread of the internal ring just in front of the external ring. This adhesive penetrates slightly between their threads. Next, ultraviolet light radiation is used to make this adhesive set and cure.

SUMMARY OF THE INVENTION

The present invention simplifies the above operations. In accordance with the invention, a method of assembling an optical system with an optical package in advance is presented. The optical package comprises a body that contains an integrated-circuit chip having an optical sensor on its front face. The optical system further has a ring into which an optical device intended to be placed in front of the said optical sensor is screwed.

According to the invention, this method comprises:

depositing adhesive on the internal thread of the said ring and/or on the thread of the optical device;

screwing the optical device into the said ring as far as an entered position;

fixing the said ring provided with the optical device to the said body of the package;

bringing the optical device to an adjustment position relative to the said optical sensor, the said adjustment position being away from its entered position, in the unscrewing direction of this optical device, relative to the said ring; and applying a treatment to the adhesive so as to fix the optical device in the said ring in the adjustment position reached.

According to the invention, the method may advantageously comprise screwing the optical device into the said ring as far as an entered position in which a peripheral annular shoulder of the optical device bears on or is a short distance from an annular shoulder of the said ring.

According to the invention, the method may advantageously comprise screwing the optical device into the said ring as far as an entered position in which an internal annular shoulder of the said ring bears on or is a short distance from an annular shoulder of the optical device.

According to the invention, the method may advantageously comprise choosing an adhesive for fixing the optical device in the said ring that cures by treating it with ultraviolet radiation.

According to the invention, the method may advantageously comprise fixing the said ring to the said body of the package via an adhesive that cures under the effect of a heat treatment.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 shows a partially exploded cross-sectional view of an optical system, according to a first manufacturing step;

FIG. 2 shows a cross section of the optical system of FIG. 1 in the mounted position, according to a second manufacturing step;

FIG. 3 shows in cross section the optical system of FIG. 2 assembled with an optical package, according to a third manufacturing step;

FIG. 4 shows an external side view of the assembly of FIG. 3, according to a fourth manufacturing step; and FIG. 5 shows, partly in cross section, the assembly of FIG. 4, according to a final manufacturing step.

DETAILED DESCRIPTION OF THE DRAWINGS

Referring to FIG. 1, it may be seen that this shows an optical system 1. The optical system 1 includes an approximately cylindrical external ring 2 having an internal thread 3 in its front portion and an internal annular shoulder 4 in its rear portion. The optical system 1 further includes an optical device 5 that includes an internal ring 6 having an external thread 7 complementary to the thread 3 of the ring 2 and a front peripheral shoulder 8. The internal ring 6 carries, in its bore, an optical member 9 such as one or more lenses (see, FIG. 2.

As shown in FIG. 1, there has been deposited, on the thread 7 of the optical system 5, a drop of liquid adhesive 10 or several drops of adhesive 10 distributed around its periphery. This adhesive 10 could alternatively be deposited on the thread 3. Next, the optical system 5 is mounted, possibly mechanically, in the ring 2 by making the thread 3 engage with the thread 7 with a screwing action as far as an entered position in which the front shoulder 8 of the optical system 5 comes into contact with or is at a short distance from the front face 2a of the ring 2 and/or in which the rear face 6a of the ring 6 comes into contact with or is a short distance from the shoulder 4 of the ring 2.

By doing this, the adhesive 10 is distributed between the thread 3 of the ring 2 and the thread 7 of the optical device 5 and is enclosed in such a way that it cannot be subjected to light radiation.

The assembly shown in FIG. 2 is therefore obtained.

As shown in FIG. 3, the next step is to mount the optical system 1 of FIG. 2 on an optical package 11 in advance. The package 11 comprises a body 12 in the form of a pan open at the front and, fixed to the bottom of the said pan, an integrated-circuit chip 13 having, on its front face, an optical sensor 14. The optical package 11 further includes, a certain distance from this-chip 13, a transparent front plate 15, for example made of glass, the peripheral edge of which is fixed to an annular portion of the body 12.

To do this, an annular layer of adhesive 16 is interposed, possibly mechanically, between the rear annular face 2b of the ring 2 and the front annular face 12a of the body 12, the said annular face projecting towards the front relative to the transparent plate 15. Care is taken during this assembly to place the optical axis of the optical member 9 so as to coincide with the optical axis of the optical sensor 14. Next, the adhesive 16 undergoes a heat treatment in order to make it set and cure.

Next, as shown in FIG. 4, the assembly shown in FIG. 3 is placed, possibly mechanically, on an adjustment bench 17 and, using a clamp 18, the ring 6 of the optical device 5 is gripped via its shoulder 8 and unscrewed until it reaches an adjustment position, away from its aforementioned entered position, in the direction of unscrewing. This places the optical member 9 in the desired adjustment position relative to the optical sensor 14 along the aforementioned optical axis.

When the adjustment position is reached, the shoulder 8 of the ring 6 is away from the front face 2a of the ring 2 and the previously deposited adhesive 10 is at least partly exposed.

As shown in FIG. 5, the adhesive 10 is subjected to ultraviolet light radiation by means of an emission head 19 that sends this radiation between the front face 2a of the ring 2 and the shoulder 8 of the ring 6. Several heads 19 may be distributed around the periphery.

What is therefore obtained is an optical assembly 20 shown in FIG. 5, which contains an integrated-circuit chip 13 with an optical sensor and an optical member 9 adjusted relative to this optical sensor. It is impossible for this assembly 20 to go out of adjustment. Insofar as the ring of adhesive 10 and the ring of adhesive 16 are impermeable, the optical assembly 20 is sealed.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of assembling an optical system with an optical package in advance, the optical package comprising a body that contains an integrated-circuit chip having an optical sensor on its front face, and the optical system having a ring into which an optical device intended to be placed in front of the optical sensor is screwed, comprising:

depositing adhesive on at least one of an internal thread of the ring and an external thread of the optical device;

screwing the optical device into the ring as far as an entered position;

fixing the ring provided with the optical device to the body of the optical package after screwing of the optical device is completed;

bringing the optical device to an adjustment position relative to the optical sensor following fixing of the ring to the optical package, the adjustment position being away from its entered position in an unscrewing direction relative to the ring; and applying a treatment to the adhesive so as to fix the optical device in the ring at the adjustment position reached.

2. The method according to claim 1, wherein screwing comprises screwing the optical device into the ring as far as an entered position in which a peripheral annular shoulder of the optical device bears on or is a short distance from an annular shoulder of the ring.

3. The method according to claim 1, wherein screwing comprises screwing the optical device into the ring as far as an entered position in which an internal annular shoulder of the ring bears on or is a short distance from an annular shoulder of the optical device.

4. The method according to claim 1, further comprising choosing the adhesive for fixing the optical device in the ring such that it cures by treating with ultraviolet radiation.

5. The method according to claim 1, further comprising choosing the adhesive for fixing the optical device in the ring such that it cures by treating with heat.

6. A method for optical system assembly, comprising:

mounting a ring structure with an internal thread to a base member carrying an optical integrated circuit;

screwing an optical element carrier with an external thread into the ring structure;

applying an adhesive to at least one of the internal and external threads before screwing such that the screwing of the optical element carrier into the ring structure distributes the applied adhesive over the threads;

rotating the optical element carrier in an unscrewing direction to adjust the positioning of the carried optical element relative to the optical integrated circuit; and treating the adhesive on the threads so as to affix the optical element to the ring structure at the adjusted position of the carried optical element.

7. The method of claim 6 wherein mounting occurs after screwing and before rotating.

8. A method for optical system assembly, comprising:

screwing an optical element carrier with an external thread into a ring structure with an internal thread;

applying an adhesive to at least one of the internal and external threads before screwing such that the screwing of the optical element carrier into the ring structure distributes the applied adhesive over the threads;

mounting the ring structure to a base member carrying an optical integrated circuit after the optical element carrier has been screwed into the ring structure;

rotating the optical element carrier in an unscrewing direction to adjust a relative positioning of the carried optical element; and treating the adhesive on the threads so as to affix the optical element to the ring structure at the adjusted position of the carried optical element.

9. The method of claim 8 wherein rotating adjusts the positioning of the carried optical element relative to the optical integrated circuit.

* * * * *